United States Patent
McEldowney et al.

(10) Patent No.: US 8,654,152 B2
(45) Date of Patent: Feb. 18, 2014

(54) COMPARTMENTALIZING FOCUS AREA WITHIN FIELD OF VIEW

(75) Inventors: Scott McEldowney, Redmond, WA (US); John A. Tardif, Sammamish, WA (US); John Clavin, Seattle, WA (US); David Cohen, Nesher, IL (US); Giora Yahav, Haifa, IL (US)

(73) Assignee: Microsoft Corporation, Redmond, WA (US)

( * ) Notice: Subject to any disclaimer, the term of this patent is extended or adjusted under 35 U.S.C. 154(b) by 577 days.

(21) Appl. No.: 12/819,414

(22) Filed: Jun. 21, 2010

(65) Prior Publication Data

US 2011/0310125 A1 Dec. 22, 2011

(51) Int. Cl.
G09G 5/00 (2006.01)

(52) U.S. Cl.
USPC ............ 345/660; 345/664; 345/671; 345/661

(58) Field of Classification Search
None
See application file for complete search history.

(56) References Cited

U.S. PATENT DOCUMENTS

| | | | |
|---|---|---|---|
| 6,768,782 B1 | 7/2004 | Hsieh et al. | |
| 6,812,968 B1 | 11/2004 | Kermani | |
| 8,442,355 B2 * | 5/2013 | Imai .............................. | 382/285 |
| 2005/0185053 A1 | 8/2005 | Berkey et al. | |
| 2008/0088719 A1 | 4/2008 | Jacob et al. | |
| 2008/0129844 A1 | 6/2008 | Cusack et al. | |
| 2009/0202114 A1* | 8/2009 | Morin et al. ................... | 382/118 |
| 2009/0219387 A1* | 9/2009 | Marman et al. ............... | 348/143 |

FOREIGN PATENT DOCUMENTS

| | | |
|---|---|---|
| WO | 2009066988 A2 | 5/2009 |
| WO | 2010026499 A2 | 3/2010 |

OTHER PUBLICATIONS

Response to Office Action filed Apr. 15, 2013 in Chinese Patent Application No. 201110179044.2.
English Summary of Response to Office Action and English translation of claims as amended in Response to Office Action filed Apr. 15, 2013 in Chinese Patent Application No. 201110179044.2.
Office Action dated Dec. 4, 2012 in Chinese Patent Application No. 201110179044.2.
Toyama, Kentaro, et al., "Probabilistic Tracking in a Metric Space," Eighth International Conference on Computer Vision, Vancouver, Canada, vol. 2, Jul. 2001, 8 pages.
Chaudhuri, "High-Resolution Slow-Motion Sequencing", Surveillance Systems and Applications, IEEE Signal Processing Magazine, Mar. 2005, pp. 16-24, http://dspace.library.iitb.ac.in/jspui/bitstream/10054/97/1/30488.
Second Office Action (and English language Summary) dated Jul. 22, 2013 in Chinese Patent Application No. 201110179044.2.
Response to Second Office Action filed Sep. 26, 2013 in Chinese Patent Application No. 201110179044.1.
English language Summary of, and English translation of claims in, Response to Second Office Action filed Sep. 26, 2013 in Chinese Patent Application No. 201110179044.1.

* cited by examiner

*Primary Examiner* — Kee M Tung
*Assistant Examiner* — Leon T Cain, II
(74) *Attorney, Agent, or Firm* — Vierra Magen Marcus LLP

(57) ABSTRACT

A system and method are disclosed for selectively focusing on certain areas of interest within an imaged scene to gain more image detail within those areas. In general, the present system identifies areas of interest from received image data, which may for example be detected areas of movement within the scene. The system then focuses on those areas by providing more detail in the area of interest. This may be accomplished by a number of methods, including zooming in on the image, increasing pixel density of the image and increasing the amount of light incident on the object in the image.

14 Claims, 17 Drawing Sheets

COMPARTMENTALIZING FOCUS AREA WITHIN FIELD OF VIEW

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, user gestures are detected, interpreted and used to control game characters or other aspects of an application.

At times, activity may be occurring within a small portion of the entire field of view. For example, a single user may be standing in a large room of stationary objects. Or a user may only be using his hand in making gestures such as controlling a user interface or performing sign language. However, conventional NUI systems process all information from a scene in the same way, regardless of whether it is static or dynamic. There is therefore a need for a system which focuses greater attention on the dynamic areas of a field of view than on the static areas of the field of view.

SUMMARY

Disclosed herein are systems and methods for selectively focusing on certain areas of interest within an imaged scene to gain more image detail within those areas. In general, the present system identifies areas of interest from received image data, which may for example be detected areas of movement within the scene. The system then focuses on those areas by providing more detail in the area of interest. This may be accomplished by a number of methods, such as for example a mechanical or digital zoom to the area, increasing the pixel density in the area, decreasing pixel density outside of the area and increasing the amount of light incident on the area. In order to process the image data within given frame rates, the areas of the image outside of the area of interest may be stored in a buffer and re-used if needed, together with the image data from the area of interest, to render an image of the scene.

In an embodiment, the present technology relates to a method of increasing image detail in one or more areas of interest in a scene captured by a capture device. The method includes the steps of: a) receiving information from the scene; b) identifying the one or more areas of interest within the scene; c) obtaining greater image detail on the one or more areas of interest within the scene relative to areas in the scene outside of the one or more areas of interest; and d) at least periodically monitoring information in the scene outside the one or more areas of interest to determine whether to re-define the one or more areas of interest.

In a further embodiment, the present technology relates to a method of increasing image detail in one or more areas of interest in a scene captured by a capture device, including the steps of: a) defining a zone of focus within the scene, the zone of focus defined to correspond with one or more expected areas of interest within the scene; and b) obtaining greater image detail on the zone of focus within the scene relative to areas in the scene outside of the one or more areas of interest.

In a further embodiment, the present technology relates to a method of increasing image detail in one or more areas of interest in a scene captured by a capture device. The method includes the steps of: a) receiving information from the scene; b) identifying one or more users within the scene; c) obtaining greater image detail on at least a body part of the one or more users within the scene relative to areas in the scene other than the one or more users; d) using the greater image detail obtained on at least the body part of the one or more users within the scene in said step c) to identify a gesture performed by the one or more users; and e) at least periodically monitoring information in the scene outside the one or more users to determine whether to add or subtract a user to the group of one or more users on which greater image detail is obtained in said step c).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1A-17, which in general relate to a system and method for selectively focusing on certain areas of interest within an imaged scene to gain more image detail within those areas. In general, the present system identifies areas of interest from received image data, which may for example be detected areas of movement within the scene. The system then focuses on those areas by providing more detail in the area of interest. This may be accomplished by a number of methods, including zooming in on the image, increasing pixel density of the image and increasing the amount of light incident on the object in the image.

Figure 1A:
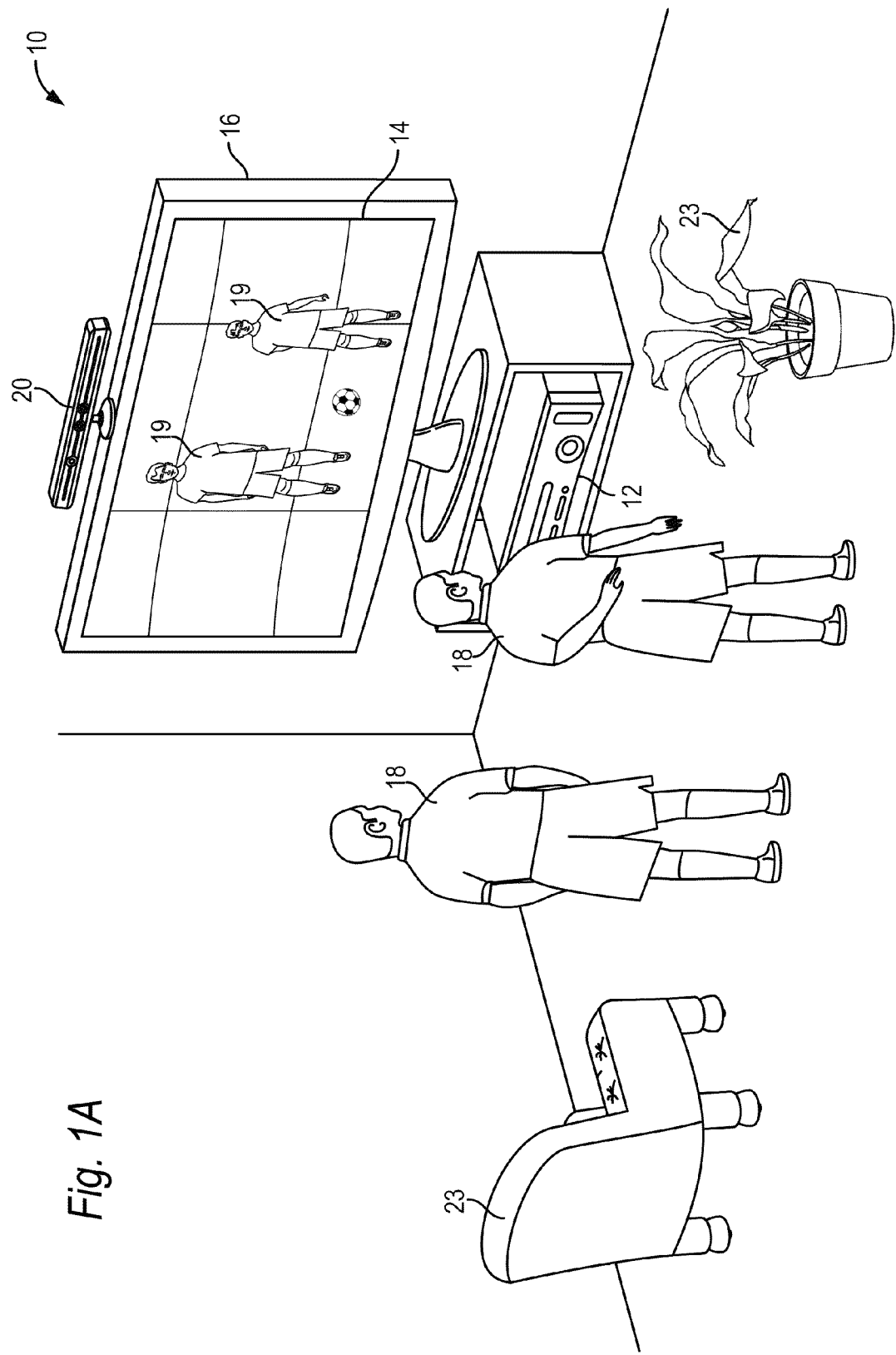
FIG. 1A illustrates an example embodiment of a target recognition, analysis, and tracking system.
Figure 1B:
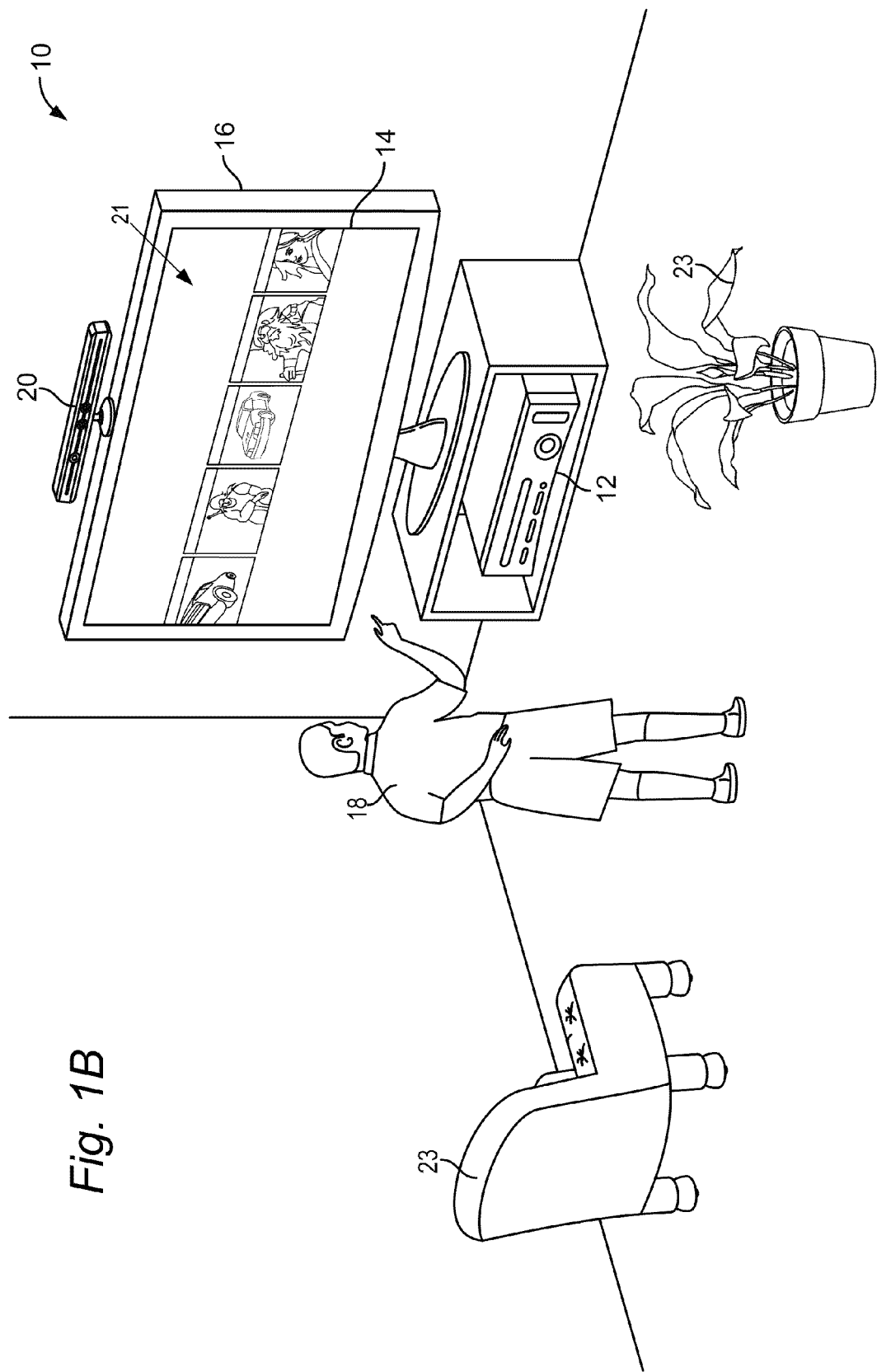
FIG. 1B illustrates a further example embodiment of a target recognition, analysis, and tracking system.
Figure 2:
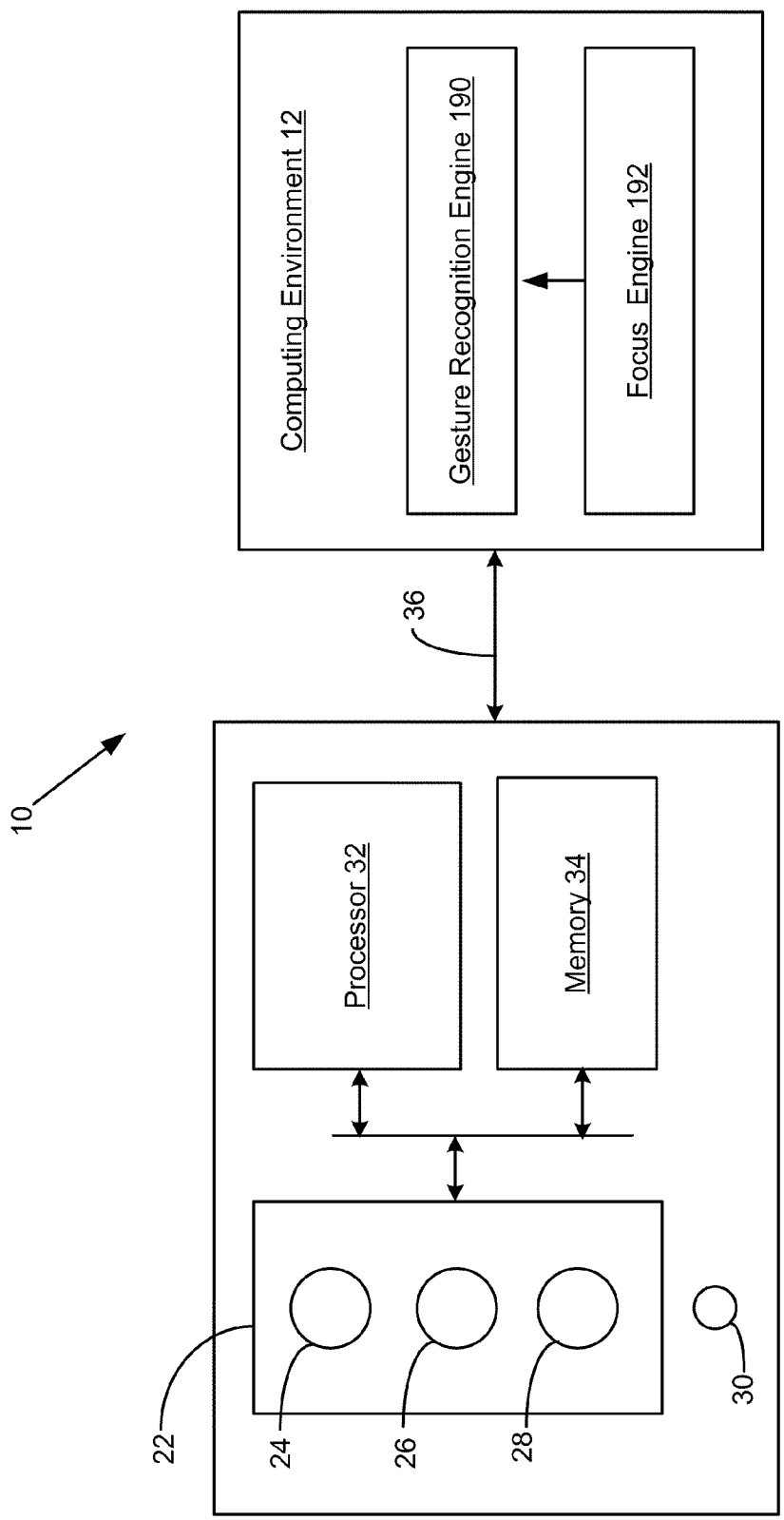
FIG. 2 illustrates an example embodiment of a capture device that may be used in a target recognition, analysis, and tracking system.

Referring initially to FIGS. 1A-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to movements, gestures and speech of one or more users, which information is received by the computing environment and used to render, interact with and/or control aspects of a gaming or other application. Examples of the computing environment 12 and capture device 20 are explained in greater detail below.

Embodiments of the target recognition, analysis, and tracking system 10 may be connected to an audio/visual device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the A/V device 16 and the capture device 20 may cooperate to render an avatar or on-screen character 19 on display 14. In embodiments, the avatar 19 mimics the movements of the user 18 in real world space so that the user 18 may perform movements and gestures which control the movements and actions of the avatar 19 on the display 14.

In FIG. 1A, the capture device 20 is used in a NUI system where for example a pair of users 18 are playing a soccer game. In this example, the computing environment 12 may use the audiovisual display 14 to provide a visual representation of two avatars 19 in the form of soccer players controlled by the respective users 18. A user 18 may move or perform a kicking motion in physical space to cause their associated player avatar 19 to move or kick the soccer ball in game space. Thus, according to an example embodiment, the computing environment 12 and the capture device 20 may be used to recognize and analyze movements and gestures of the users 18 in physical space, and such movements and gestures may be interpreted as a game control or action of the user's associated avatar 19 in game space.

The embodiment of FIG. 1A is one of many different applications which may be run on computing environment 12, and the application running on computing environment 12 may be a variety of other gaming and non-gaming applications. Moreover, the system 10 may further be used to interpret user 18 movements as operating system (OS) and/or application controls that are outside the realm of games or the specific application running on computing environment 12. One example is shown in FIG. 1B, where a user 18 is scrolling through and controlling a user interface 21 with a variety of menu options presented on the display 14. Virtually any controllable aspect of an operating system and/or application may be controlled by the movements of the user 18.

Both FIGS. 1A and 1B further show static objects 23, such as the chair and plant. These are objects within the scene (i.e., the area captured by capture device 20), but do not change from frame to frame. In addition to the chair and plant shown, static objects may be any objects picked up by the image cameras in capture device 20. The additional static objects within the scene may include any walls, floor, ceiling, windows, doors, wall decorations, etc.

Suitable examples of a system 10 and components thereof are found in the following co-pending patent applications, all of which are hereby specifically incorporated by reference: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user 18.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may perform a variety of actions. The computing environment may further determine which controls to perform in an application executing on the computer environment based on, for example, gestures of the user that have been recognized from the skeletal model. For example, as shown, in FIG. 2, the computing environment 12 may include a gesture recognizer engine 190 for determining when the user has performed a predefined gesture. The computing environment 12 may further include a focus engine 192 for focusing on interesting areas from a scene as explained below. Portions, or all, of the focus engine 192 may be resident on capture device 20 and executed by the processor 32.

Figure 3A:
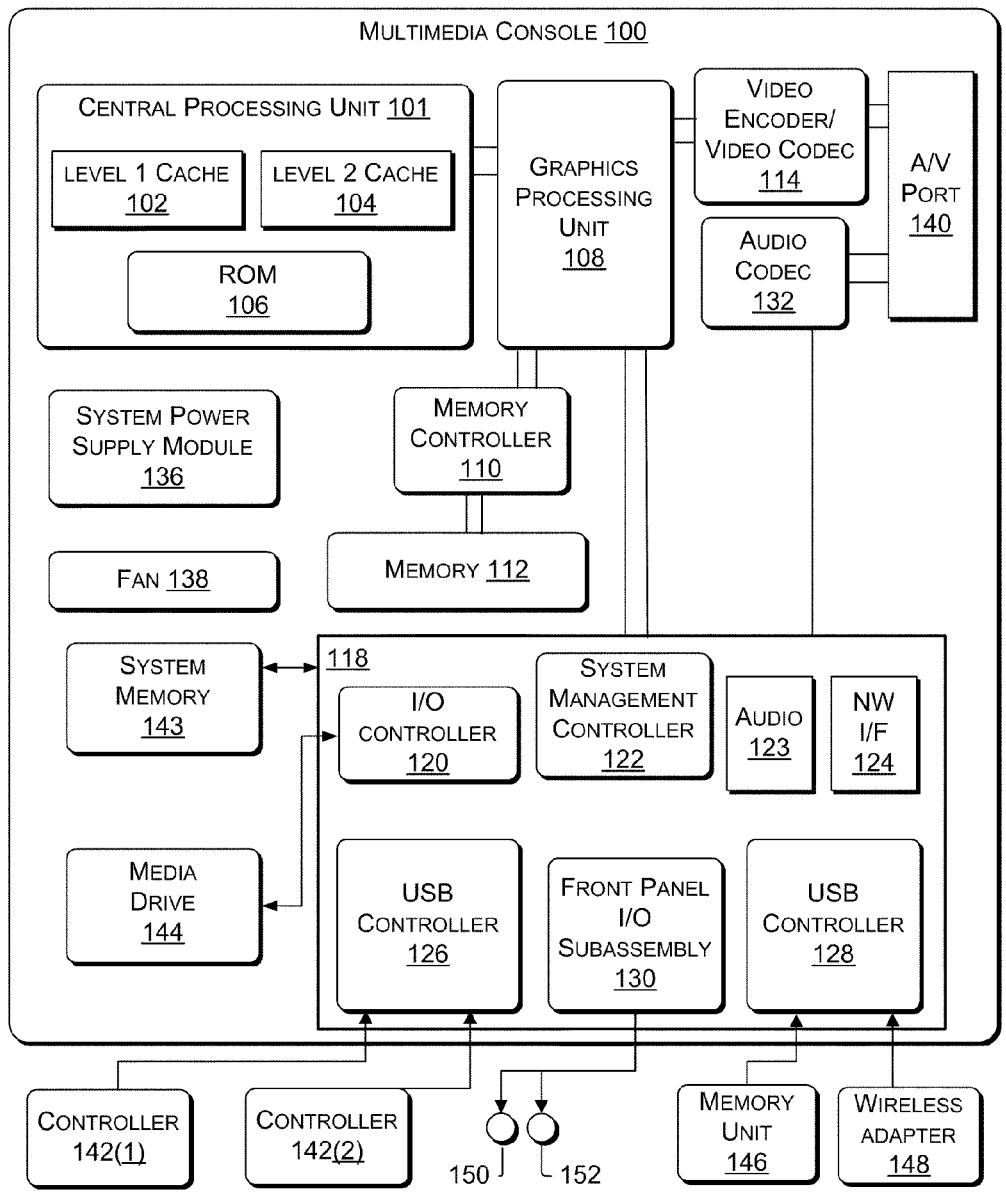
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more positions and motions of a user in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the AN port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
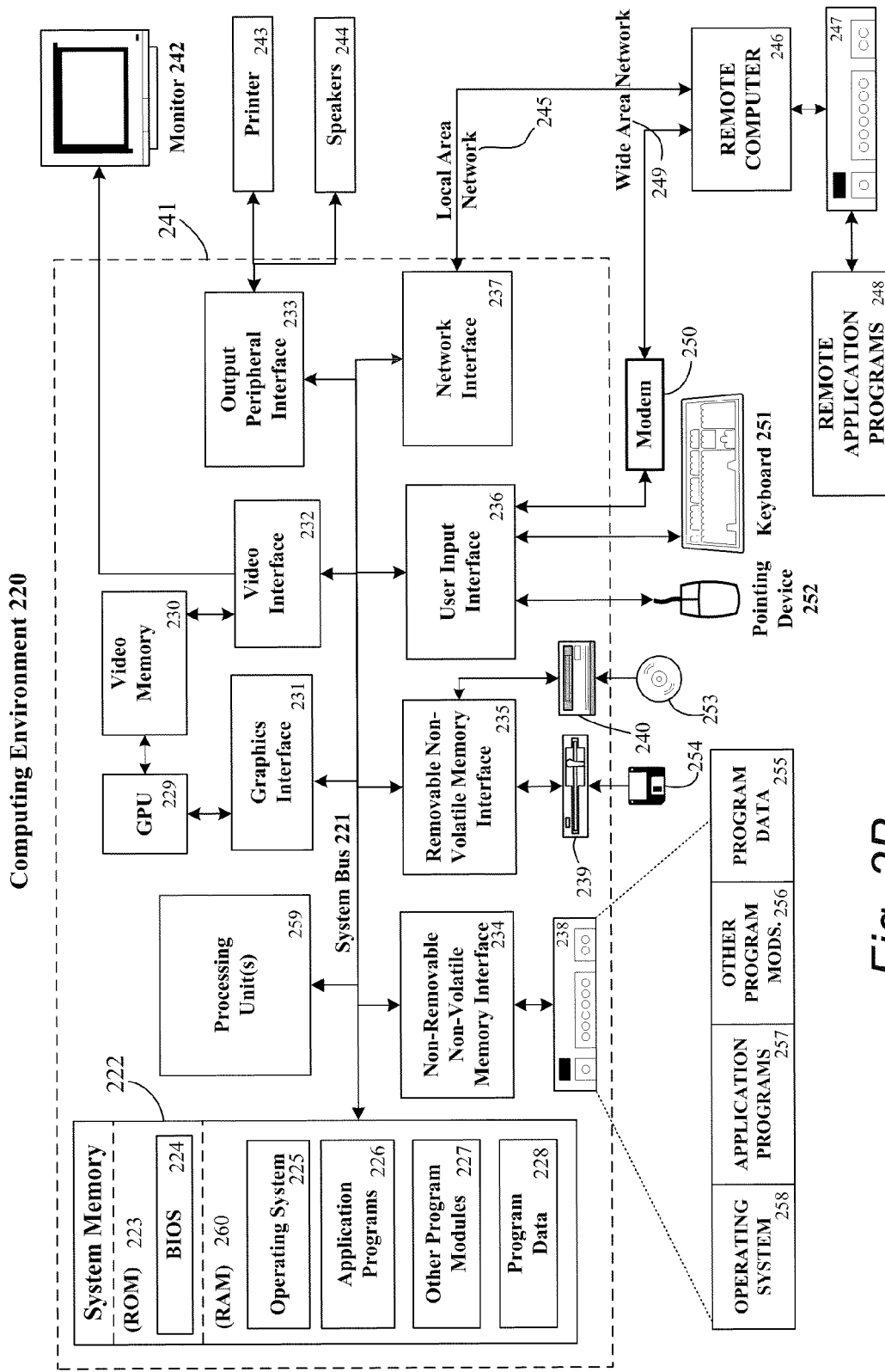
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more positions and motions in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228. FIG. 3B further includes a graphics processor unit (GPU) 229 having an associated video memory 230 for high speed and high resolution graphics processing and storage. The GPU 229 may be connected to the system bus 221 through a graphics interface 231.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
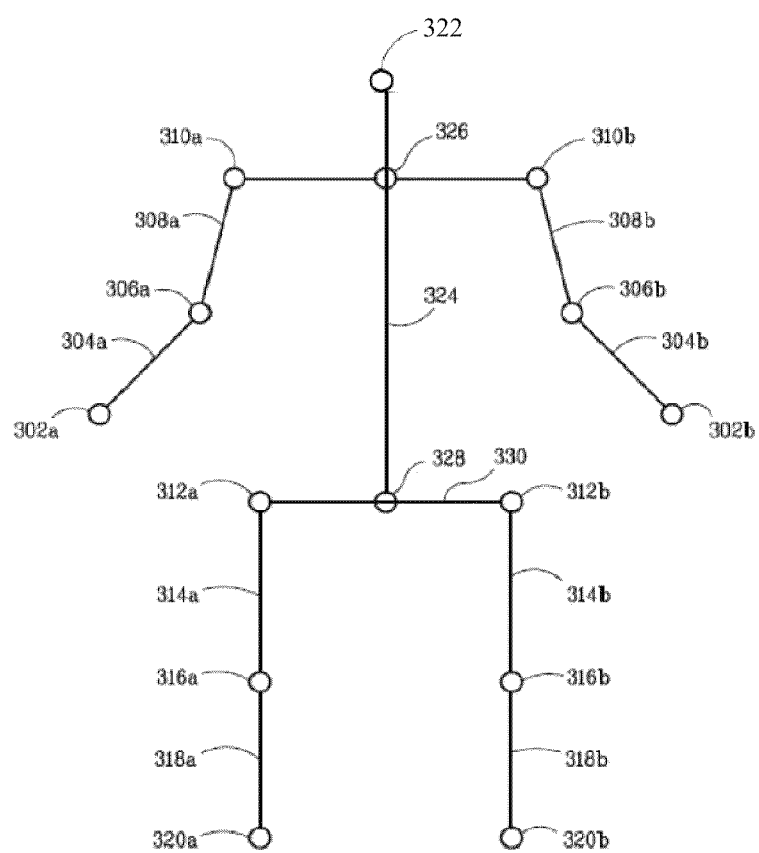
FIG. 4 illustrates a skeletal mapping of a user that has been generated from the target recognition, analysis, and tracking system of FIGS. 1A-2.

FIG. 4 depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and the bottom 328 of the spine, and the waist 330. Where more points are tracked, additional features may be identified, such as the bones and joints of the fingers or toes, or individual features of the face, such as the nose and eyes.

As indicated in the Background section, it may at times be desirable to obtain more detailed image data from certain objects in a scene without introducing latency into the rendering of images. In accordance with aspects of the present technology, areas of interest may be identified within a scene, and those areas may be focused on to obtain greater image detail from those areas.

Figure 5:
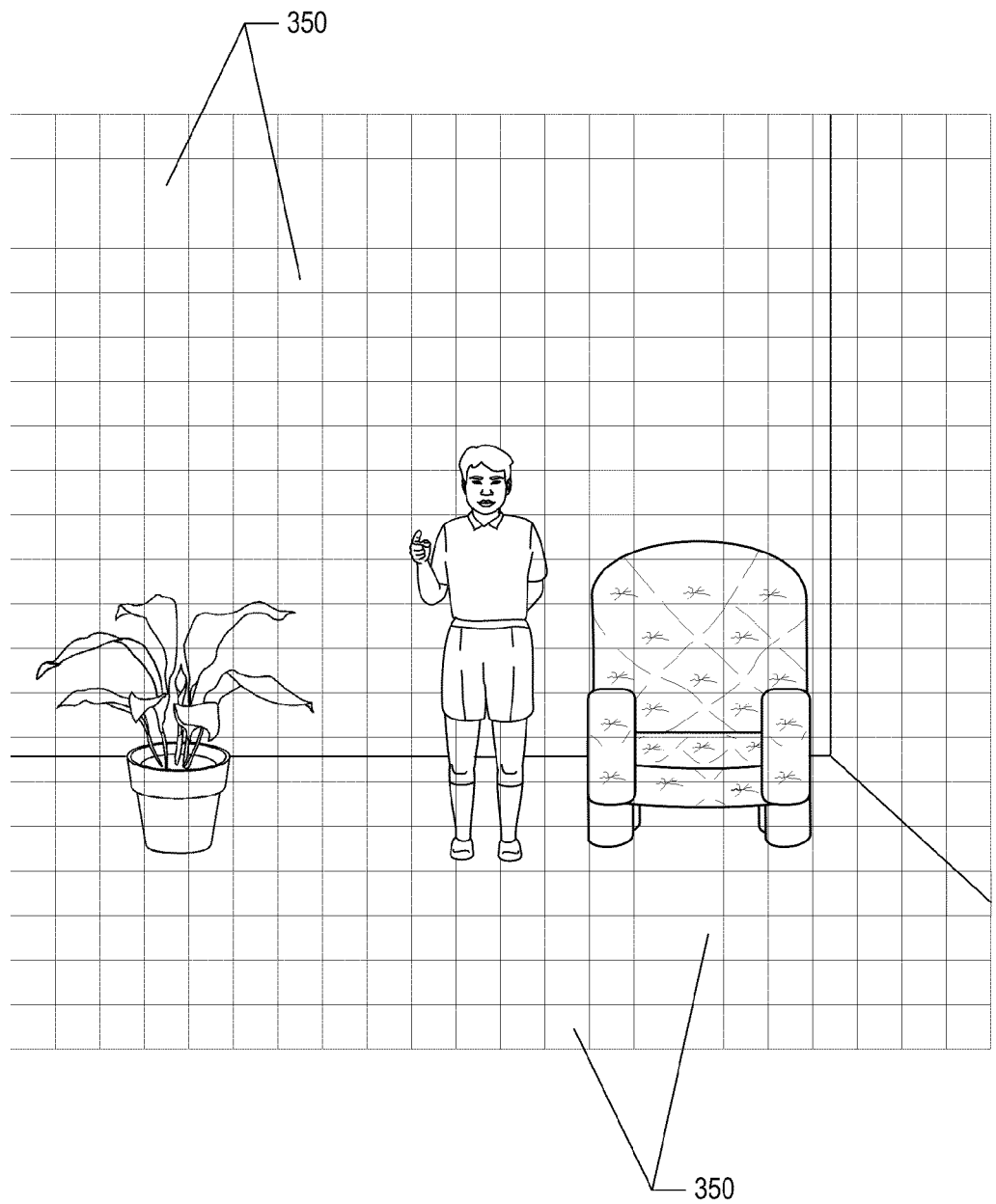
FIG. 5 is an illustration of a pixilated image of a scene captured by a capture device.

FIG. 5 shows an image as detected by the sensors of the image camera component 22 of capture device 20. It may for example be the user interacting with the onscreen user interface as shown in FIG. 1B. The image is broken down into a lattice of horizontal rows and vertical columns of pixels 350 (some of which are numbered in the figures). Where image camera component 22 is a depth camera 26, each pixel in the lattice captures an x, y and z location of objects in the scene, where a z-axis is defined straight out from a camera lens, and the x-axis and y-axis are horizontal and vertical offsets, respectively, from the z-axis. Where camera component 22 is an RGB camera 28, each pixel in the lattice captures an RGB value of objects in the scene. The RGB camera is registered to the depth camera so that each frame captured by the cameras 24 and 26 are time synchronized to each other. The scene of FIG. 5 shows the user 18 and stationary objects 23 such as a chair and plant, which are captured by the pixels 350. The image detail in the scene is evenly distributed across all pixels 350.

Figure 6:
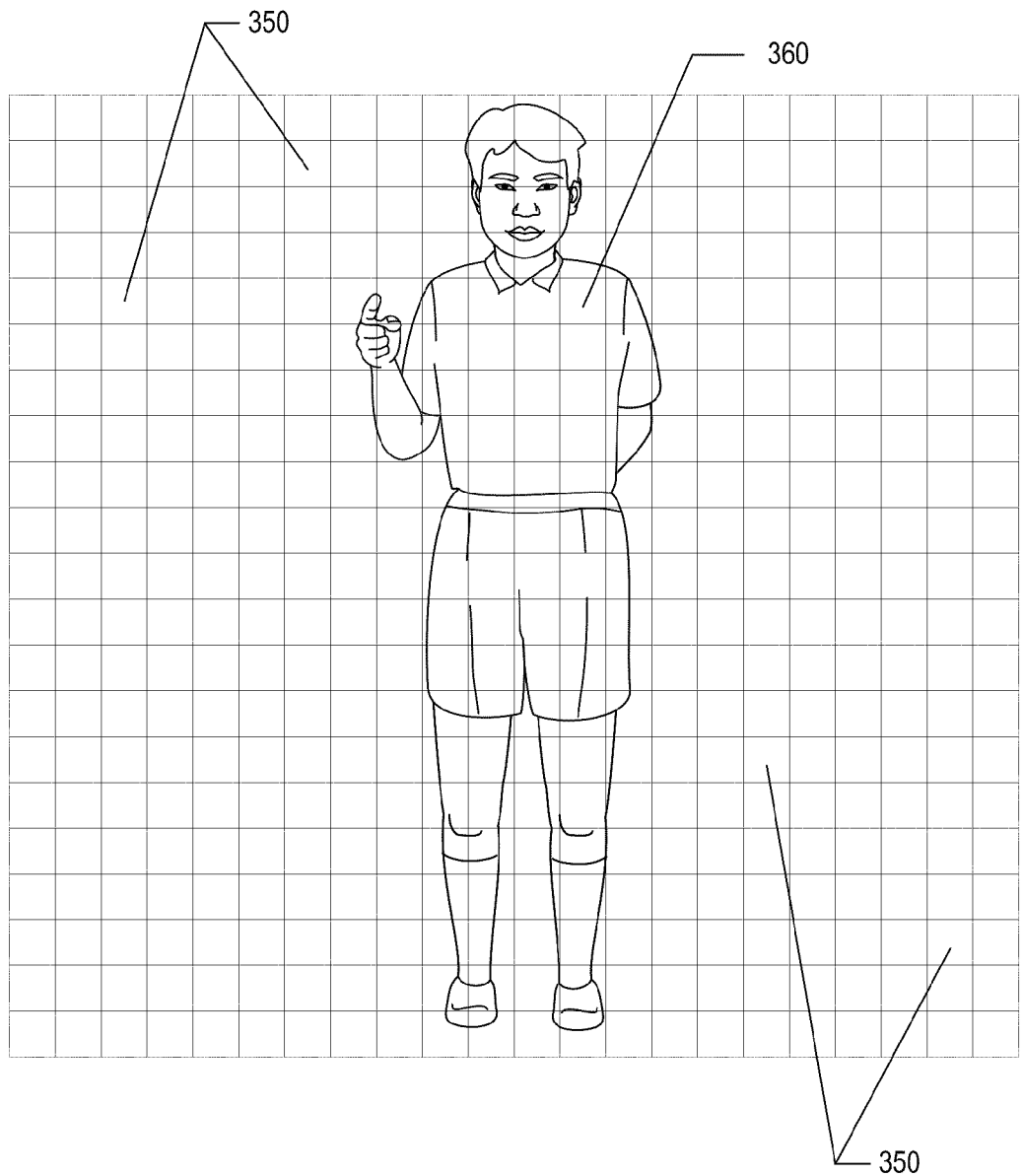
FIG. 6 is an illustration of a pixilated image showing greater focus on an area of interest in a scene captured by a capture device.

Details of an embodiment of the present technology are now explained with reference to the illustrations of FIGS. 6 through 10 and the flowcharts of FIGS. 11 through 15. FIG. 11 shows a first embodiment referred to herein as active focus on areas of interest from a scene (as distinguished from passive focus explained below with respect to FIG. 13). In FIG. 11, the system 10 may be launched in step 400. Thereafter, the system may capture and render a number of frames, n (explained below), of image data from the depth camera 26 and RGB camera 28 in step 402. Data from all pixels 350, from both the depth camera 26 and RGB camera 28, is captured and sent to the computing environment for processing. In embodiments, the processor may analyze the data and determine the presence of a user from recognition of a skeletal pattern. The system may also render an image on the display based on the detected image data in step 402. In the example of FIG. 6, the image data is used to detect interaction with a user interface for controlling the computing environment 12, or an application running on the computing environment 12.

In embodiments, the focus engine 192 analyzes the n frames of data in step 404 and identifies one or more areas of interest within the scene. An area of interest may be defined in different ways in different embodiments. In one embodiment, an area of interest may be one or more areas at which movement is detected within the scene, such as for example movement of the user 18 within the scene. Instead of an area of interest being the entire user, in embodiments the area of interest may be limited to a particular body part of a user, such as their head, hands, feet or other body parts where it may be of interest to obtain detailed image data of the body part.

In a further embodiment, the area of interest may be defined by the application running on the computing environment 12. For example, where the application is a hand-signing language application, the area of interest may be around a user's left and/or right hand, whether those hands are moving or not. In further embodiments, certain features of a scene may always be treated as areas of interest, regardless of the application or detected movement. For example, one embodiment may always treat the user's head as an area of interest so that details of facial expressions and/or speech may be detected.

In embodiments, the static objects in the scene, such as the chair and plant 23, as well as any captured walls, floor, ceiling, windows, doors and wall decorations, would not be considered areas of interest. Areas of a scene not included within an area of interest are referred to herein as static areas. Objects other than users may also be included within an area of interest from a scene. For example, an object held by a user or otherwise moved around by the user in real world space may be (or be included within) an area of interest. Moreover, in embodiments, a static object that is not moved by a user may also be included in an area of interest where the object somehow relates to the application running on the computing environment 12, and has detail or information that may need to be sensed by the camera component 22 for use by the application.

As indicated, the number of frames, n, in step 402 may be the number of frames needed for the focus engine 192 to analyze the image data and discern areas of interest in the scene in step 404. The focus engine 192 may perform this action by a variety of methods. In one embodiment discussed above, the computing environment receives image data from the capture device 20 and is able to recognize a user from his or her skeletal structure, as well as his position in the scene. Once the computing environment 12 recognizes a user and his position, the focus engine 192 may define that position as an area of interest within the scene. In such embodiments, the focus engine 192 may be able to make this determination from one or two frames of data. In such an example, n may equal one or two frames of data in step 402.

Where the computing environment is able to determine from the n frames of data that the person is sitting down, or otherwise not moving, except for one or more body parts, the system determines which body part(s) are moving and the focus engine 192 defines those one or more body parts as area(s) of interest in the scene. The computing environment is able to make this determination in a variety of ways, including for example comparing the image data for a first frame against the image data for a second frame. In such embodiments, n may equal two or three frames of data in step 402. It is appreciated that n may be any number of frames that the focus engine 192 needs to distinguish moving from non-moving objects (or body parts) in a scene.

In step 404, the focus engine 192 identifies the areas of interest in a scene. In step 406, the focus engine may store the static areas of a scene in a buffer or other memory for use as explained below.

In step 410, the focus engine focuses on the defined area(s) of interest. Focusing here means providing greater image detail regarding the area(s) of interest. In one embodiment, this may mean zooming in on the area(s) of interest, while excluding static areas from view. The focus engine 192 may focus on the area of interest to obtain the largest zoom of the area of interest that will fit entirely within the height and/or width of the field of view of the camera component 22. In further embodiments, the focus engine may zoom in on the area of interest less than the largest zoom possible.

Figure 6A:
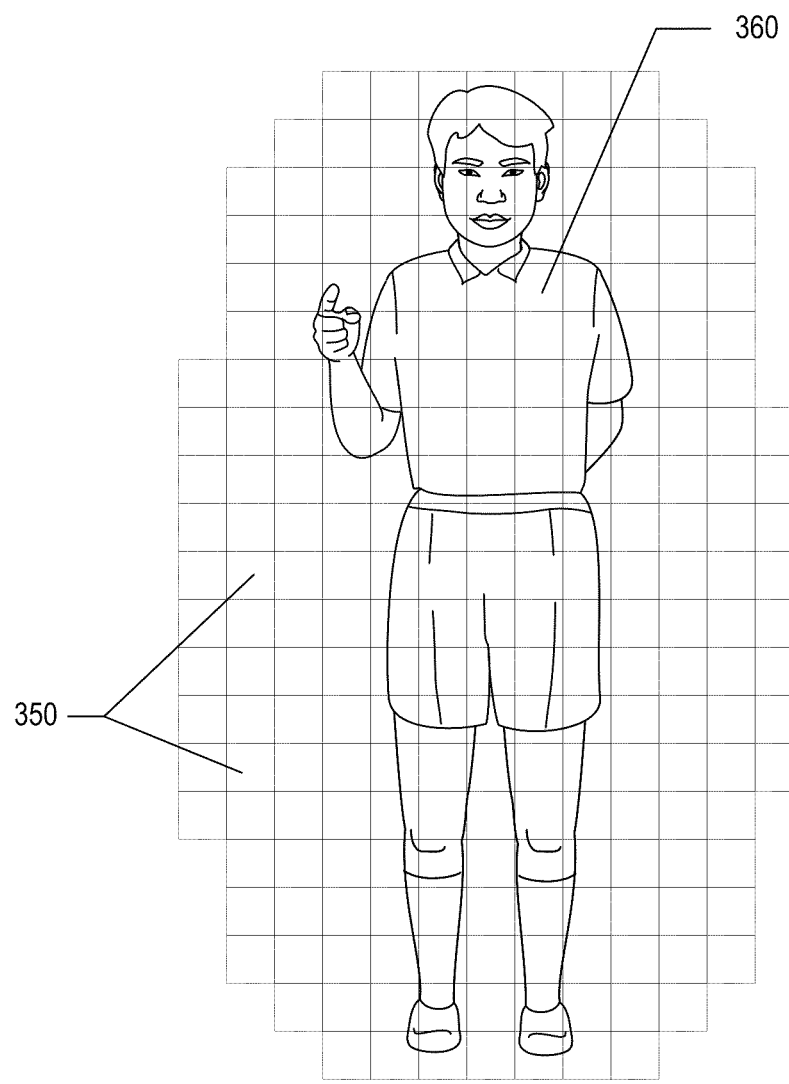
FIG. 6A is an illustration of an alternative pixilated image showing greater focus on an area of interest in a scene captured by a capture device

FIG. 6 is an image of the same scene as FIG. 5, but in FIG. 6, the focus engine has caused the camera components 22 to zoom in on the area of interest 360, which in FIGS. 5 and 6, is the user 18. As shown in FIG. 6, upon zooming in, more pixels 350 are used to represent the user 18 than in FIG. 5, thus providing more image detail of the user 18. FIG. 6 shows an embodiment where the full lattice of pixels are used to capture the area of interest 360. In a further embodiment, only a portion of the pixels 350 around the area of interest 360 are used to capture the area of interest. The focus engine 192 can determine which pixels 350 are used to capture the area of interest in FIGS. 6 and 6A, and the focus engine may ignore the data from pixels not used to capture the area of interest. This may further reduce processing speed and avoid latency in rendering a frame.

Figure 7:
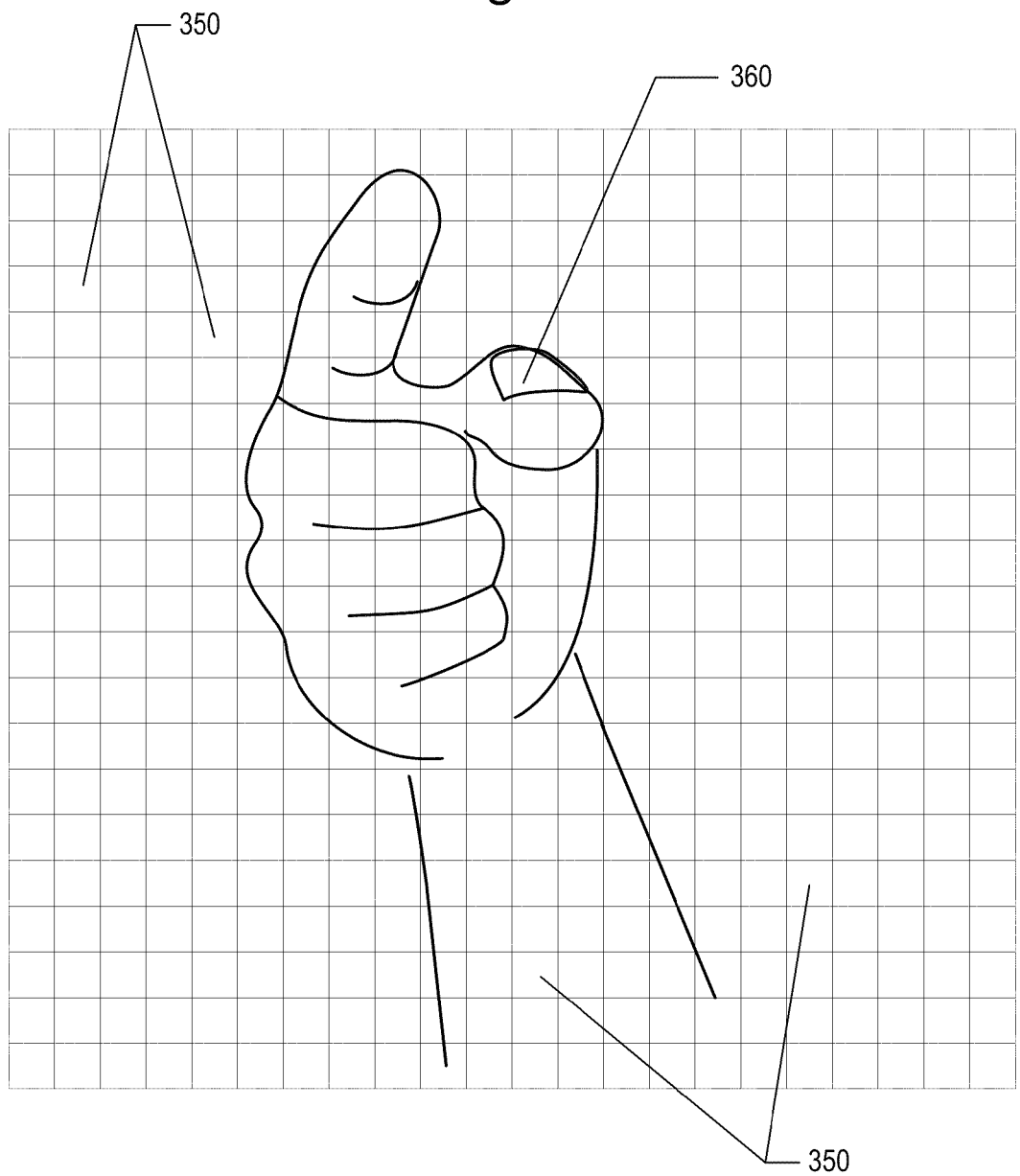
FIG. 7 is an illustration of a pixilated image showing greater focus on an alternative area of interest in a scene captured by a capture device.

In embodiments, the depth camera 26 and RGB camera 28 operate in unison to zoom in on the same object and to the same degree. As explained below, they need not zoom together in further embodiments. FIG. 7 is similar to FIG. 6, but the area of interest is a user's head. In the embodiment of FIG. 7, a much larger number of pixels are used in the image data to capture the user's face and head in comparison to the full-scene view of FIG. 5 so as to provide much greater detail of the user's facial expressions and how the user's lips and tongue move when he speaks.

The zooming of camera components 22 described above may be an optical (mechanical) zoom of a camera lens, or it may be a digital zoom where the zoom is accomplished in software. Both mechanical and digital zoom systems for cameras are known and operate to change the focal length (either literally or effectively) to increase the size of an image in the field of view of a camera lens. An example of a digital zoom system is disclosed for example in U.S. Pat. No. 7,477,297, entitled "Combined Optical And Digital Zoom," issued Jan. 13, 2009 and incorporated by reference herein in its entirety.

In step 412, the camera component 22 may capture the next frame of image data. The image data is focused on the area(s) of interest, as shown for example in FIGS. 6 and 7. The static areas of the view are largely or entirely omitted from the image data captured in step 412.

Instead of, or in addition to, the zooming of one or both camera components 22 described above, various known algorithms may be run on the image data in step 416 by the focus engine 192 to enhance the image data for the area of interest. In embodiments using these image enhancing algorithms, the algorithms may be run on the image data for the area of interest from both the depth camera and the RGB camera. Alternatively, a first image enhancing algorithm may be run on the depth camera data and a second, different image enhancing algorithm may be run on the RGB camera data. In further embodiments, one of the depth and RGB cameras may be optically or digitally zoomed as described above, while the image data from the other of the depth and RGB cameras may be enhanced with an image enhancing algorithm, with the results being matched to provide the focused data for the area of interest. Step 416 may be omitted in embodiments of the present technology (and is accordingly shown in dashed lines in FIG. 11).

Figure 8:
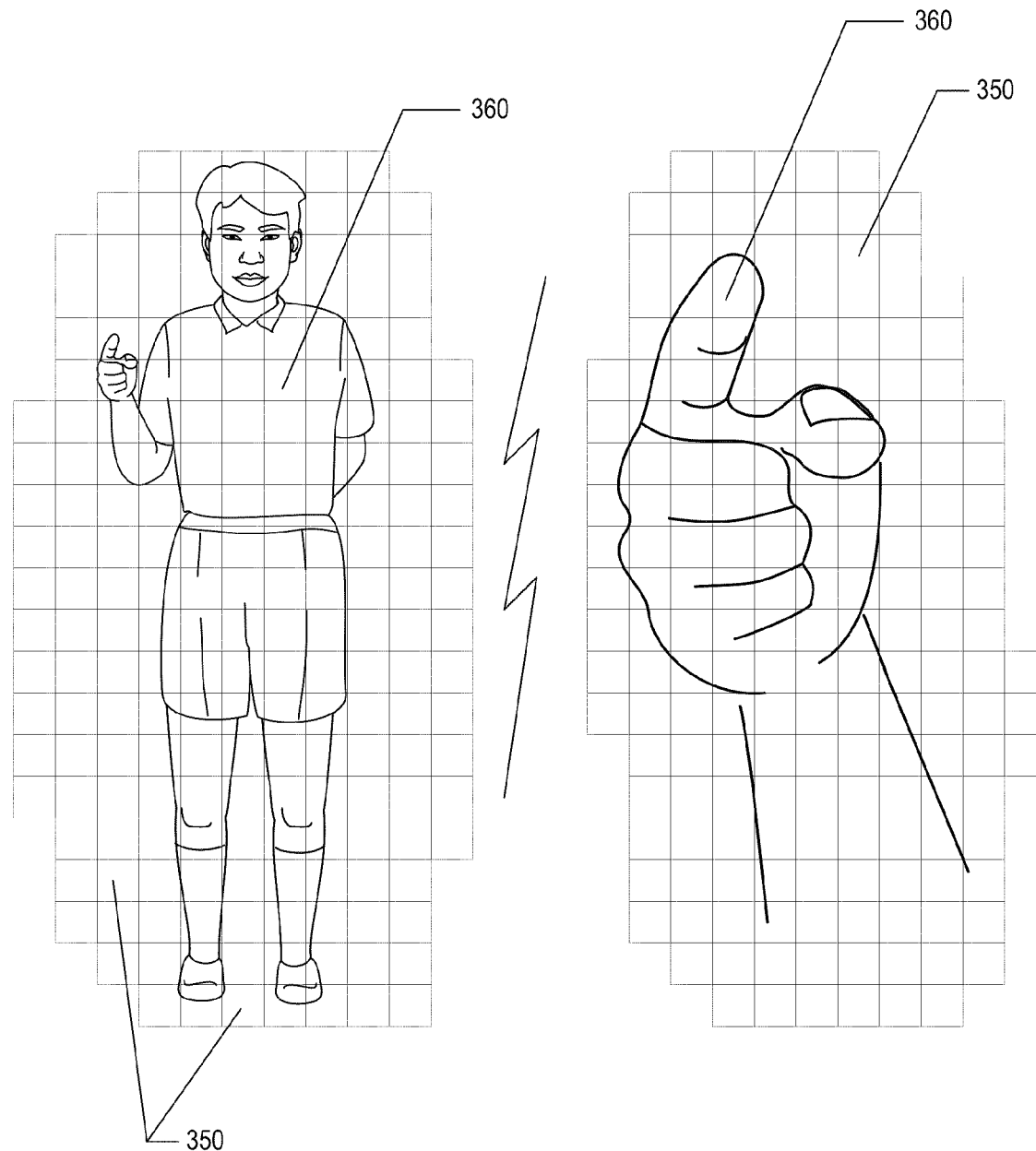
FIG. 8 is an illustration showing a pair of pixilated images of two areas of interest from a scene captured by a capture device.

FIG. 8 shows an embodiment where the scene includes two areas of interest; namely the user and the user's hand. The focus engine 192 is able to focus on these two areas independently, using for example digital zoom techniques and, possibly, image enhancing algorithms. The focused image of the user on the left provides greater detail of the user in comparison to the full-scene view, and the focused image on the right provides even greater detail of the user's hand than the full-scene view or the focused view on the left. It is understood that more than two active views may be generated from a single scene at a given time in further embodiments.

The focused image data obtained from the area of interest may be used for a variety of purposes. In step 418, the focused image data may be used to control an application or operating system function. Alternatively or additionally, the focused image data may be used for gesture recognition by a gesture recognition engine 190 explained below. In particular, the focused image data allows recognition of finer and more subtle gestures which require a high degree of detail as to how a user performs the gesture.

For example, in hand-signing applications, subtle differences in hand position may mean different things, and correspond to different predefined gestures. In such embodiments, the area of interest may be the user's hand(s), and the focused image data provides a level of detail that allows the gesture recognition engine 190 to distinguish between different hand gestures. In a further example, an application may interpret facial expression, and perform different actions based on different detected facial expressions. In such embodiments, the area of interest may be the user's head or face, and the focused image data provides a level of detail that allows the gesture recognition engine 190 to distinguish between different facial expressions.

Another application may seek to implement or augment speech recognition by analyzing and interpreting mouth and tongue movements in forming words and sounds. In such embodiments, the area of interest may be the user's head or face, or the user's mouth in particular, and the focused image data provides a level of detail that allows the gesture recognition engine 190 to distinguish between different mouth/tongue positions in forming sounds and words. These above uses of the focused image data are provided by way of example only. It is understood that the focused image data in accordance with the present technology may be used for any other purpose where user movements (subtle or otherwise) are used for gesture recognition or application/OS control.

In addition to gesture recognition and application/OS control, the focused image data may be used to render an image in step 424. In many cases, the focused image data will be used to animate the user's avatar 19 on the display 14 in a monkey see monkey do fashion. The focused image data may be used in particular to provide accurate re-creation of the user movements in the areas of interest covered by the focused image data.

If any elements from static areas of the scene are needed in the render step, the computing environment can retrieve those elements from memory in step 422 prior to render step 424. The static area image data is stored in memory as described above in step 406. The present technology takes advantage of the fact that certain objects in a scene, such as for example chair and plant 19, do not change and do not need to be imaged for each frame. It is thus another feature of the present technology that processing time is saved in not re-sampling and processing the static areas of a scene for each frame.

Not having to recapture static areas allows the focus engine 192 to focus specifically on the areas of interest. However, it may happen that a scene changes from time to time at areas outside of the areas of interest. For example, other users may come into or exit the scene. Accordingly, the focus engine 192 may periodically pull back to get current image data of an entire scene. In step 426, the focus engine checks whether it has been focused on the area(s) of interest for some number of frames, m. If not, the focus engine 192 may return to step 412 to acquire the next frame of image data from the capture device 20 focused on the area(s) of interest.

On the other hand, if the focus engine 192 has been focused on the area(s) of interest for m number of frames, the focus engine returns to step 402 to acquire live image data of the entire scene. The number of frames m may be selected based on different competing factors. The larger the value of m, the less processing time is wasted in sampling and processing image data from static areas of a scene. However, the larger the value of m, the more likely it is that another object such as another user has entered the scene undetected by the capture device 20. In embodiments, m may be between 2 frames and 300 or greater frames.

For larger values of m, if a new user is found in the scene upon returning to step 402, that new user may need to be rendered on the display along with the existing user(s). In this instance, an avatar for the new user may simply appear on the display. Alternatively, the avatar for the new user may be blended into the scene, or the computing environment 12 may show the new avatar as moving into the scene from the side (this movement would not be based on actual image data for the new user).

In a further embodiment, the system 10 may employ two capture devices 20. The first capture device operates as described above, focusing on areas of interest. The second capture device 20 may stay trained on the entire scene. In such an embodiment, the focus engine need not return to step 402 every m frames, but instead, it may stay focused on the area(s) of interest until such time as new objects enter the scene, as detected by the second capture device 20. If and when the second capture device detects a change in the scene, the first capture device may return to step 402 to capture image data from the entire scene. Alternatively, image data from the entire scene may be used from the second capture device, and combined with the focused image data from the first capture device. As long as the positions of the two capture devices are known with respect to each other, the two views from the different capture devices may be resolved to the same perspective (for example from the view of the first capture device) using known transformation matrices.

In the above embodiment using two different capture devices, it may be desirable to stitch together elements from the view of one capture device into the view of the other capture device for rendering purposes. Such stitching may be accomplished in a smooth and seamless manner, for example as disclosed in U.S. Patent Publication No. 2007/0110338, entitled "Navigating Images Using Image Based Geometric Alignment and Object Based Controls," published May 17, 2007, which publication is used in the technology of Photosynth™ image recognition software from Microsoft Corporation, and which publication is incorporated herein by reference in its entirety.

In the embodiments described thus far, pixel density has been maintained at a constant and the increased detail was gained by zooming in on an area of interest. In a further embodiment, the pixel density of pixels capturing an area of interest in a scene may be increased relative to the surrounding static areas of the image. One example of such an embodiment is explained below with reference to the flowchart of FIG. 12 and the illustration of FIG. 9. The system 10 is launched in step 430, and in step 434, the capture device 20 acquires n frames of image data which are rendered as described above. In step 438, the focus engine 192 identifies area(s) of interest in the scene as described above. As indicated, such areas may be areas where movement in the scene is detected.

Figure 9:
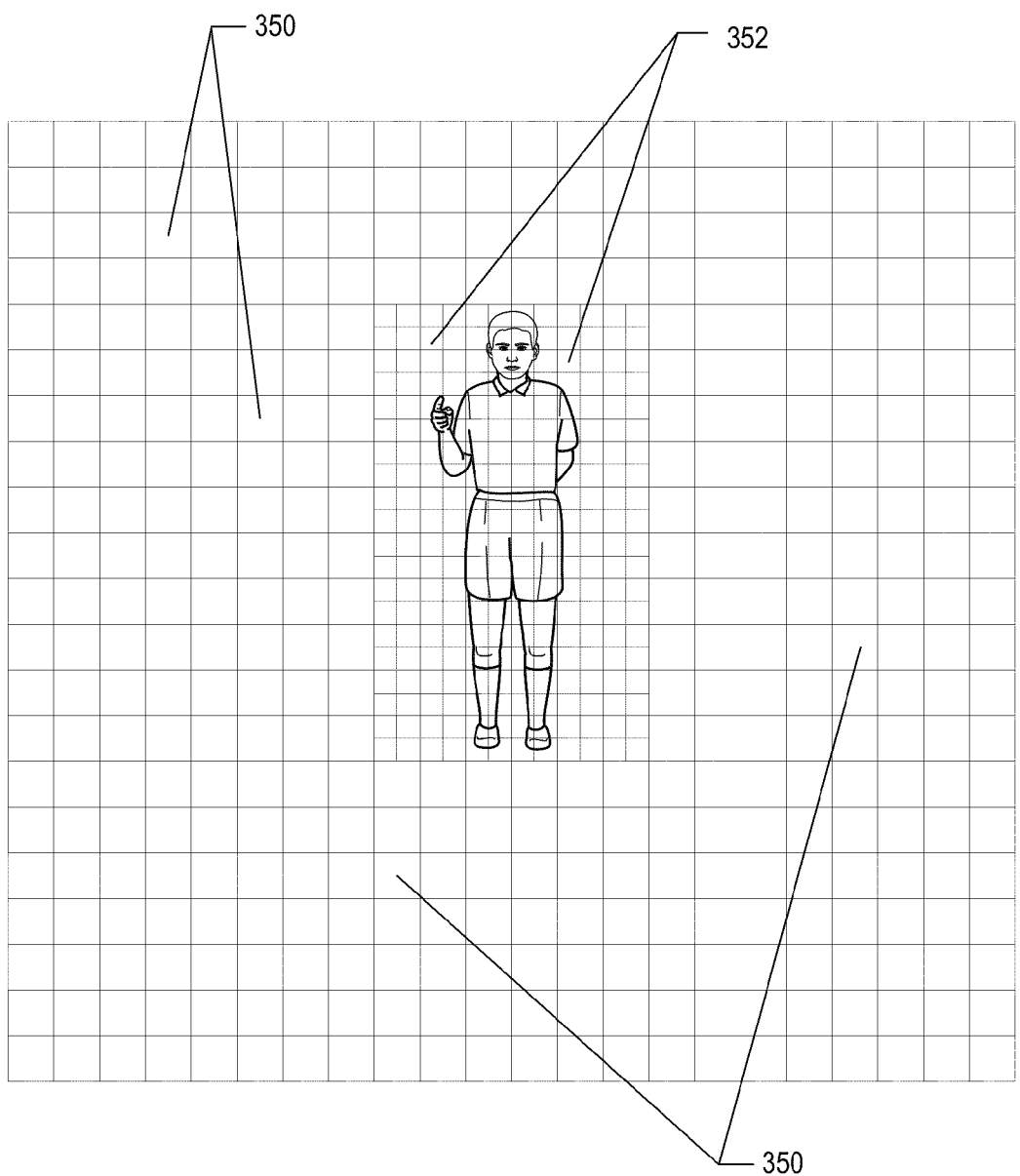
FIG. 9 is an illustration showing a pixilated image having an increased pixel density in an area of interest in the scene captured by a capture device.

Once one or more areas of interest are detected in step 438, the pixel density of pixels capturing the one or more areas of interest in the scene may be increased relative to the surrounding static areas of the image. This may be accomplished in a number of ways. In one embodiment, a camera itself may have the ability to selectively increase pixel density in one area relative to another. In such embodiments, the camera (depth and/or RGB) would capture image data in step 434, the focus engine 192 would identify the areas of interest, and the focus engine would then relay that information back to the camera for the camera to increase pixel density around the one or more identified areas of interest. FIG. 9 shows an image including pixels 350 as described above, and a second group of higher density pixels 352 around an area of interest.

In a further embodiment, the pixilation from the camera may remain constant, but the focus engine 192 or other processing algorithm in capture device 20 or computing environment 12 may process the image data in the one or more areas of interest upon receipt to increase the pixel density in those areas. Sub-pixelation techniques may be used to divide pixels in the area(s) of interest to smaller units. In a further embodiment, all image data may be obtained at a relatively high pixel density. Once the image data is obtained, the image data for the static areas of the image may be processed to combine neighboring pixels, for example by pixel binning techniques. In such an example, the combined pixels for the static areas of the scene and the higher density pixels for the area(s) of interest from a scene may be processed within the frame rate of the computing environment (of for example 30 Hz) without latency.

In a further embodiment, two different capture devices 20 may be used as described above; one capturing image data at a relatively high resolution, and the second capturing data at a second, lower resolution. Once the image data is obtained from both capture devices, the higher resolution data from the first camera may be used for image data of the areas of interest. The lower resolution data from the second camera may be used for image data of the static areas of the scene. As indicated above, the different views from the cameras may be translated into a common view, for example of the first camera and rendered. If necessary, the two views may be stitched together for rendering purposes, such as for example as disclosed in the above incorporated U.S. Patent Publication No. 2007/0110338.

The next frame of data may then be obtained in step 442 including the higher density image data for the area of interest. That image data may be used in step 444 as described above to recognize a user gesture, control aspects of the application running on the computing environment and/or control aspects of the operating system on the computing environment 12. The image data including the higher density image data for the area of interest may also be used to render an image in step 446 as explained above.

In this embodiment where relative pixel density between the areas of interest and static areas is varied, there is no need to periodically return to a full view of the scene as described above in zoomed embodiments. This is so because the capture device 20 is capturing the full scene in all frames. As such, the focus engine 192 can detect when objects enter or leave the scene. In step 448, the focus engine 192 checks for any objects entering or leaving the scene from the new frame of data. If no objects are detected entering or leaving the scene, the area(s) of interest stay the same. The system returns to step 440, increases (or maintains the increase) in pixel density around the area of interest and captures the next frame of data. On the other hand, if an object is detected entering or leaving the scene, the focus engine returns to step 434 so that the area(s) of interest may again be identified.

In the examples discussed above, the area(s) of interest are actively identified, and the areas of interest may change with new frame data. In a further embodiment of the present technology, the area(s) of interest may be set passively. That is, one or more predefined zones of focus may be set within the scene, and greater focus is provided for image data within those zones. The zones do not change as users or other objects move into and out of the scene. Such an embodiment is explained below with reference to the flowchart of FIG. 13 and the illustration of FIG. 10.

Figure 10:
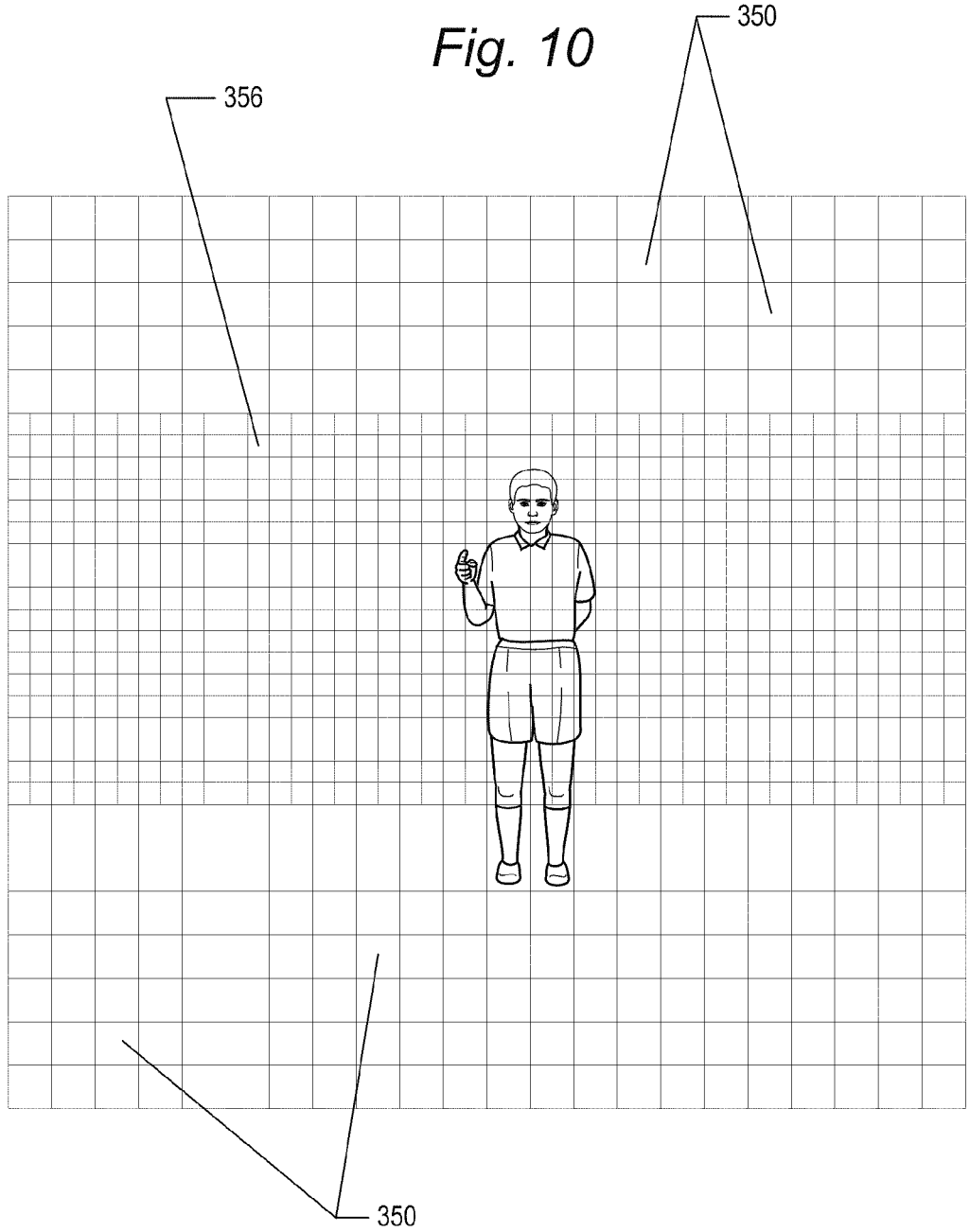
FIG. 10 is an illustration showing a zone of focus within an image of a scene captured by a capture device.
Figure 11:
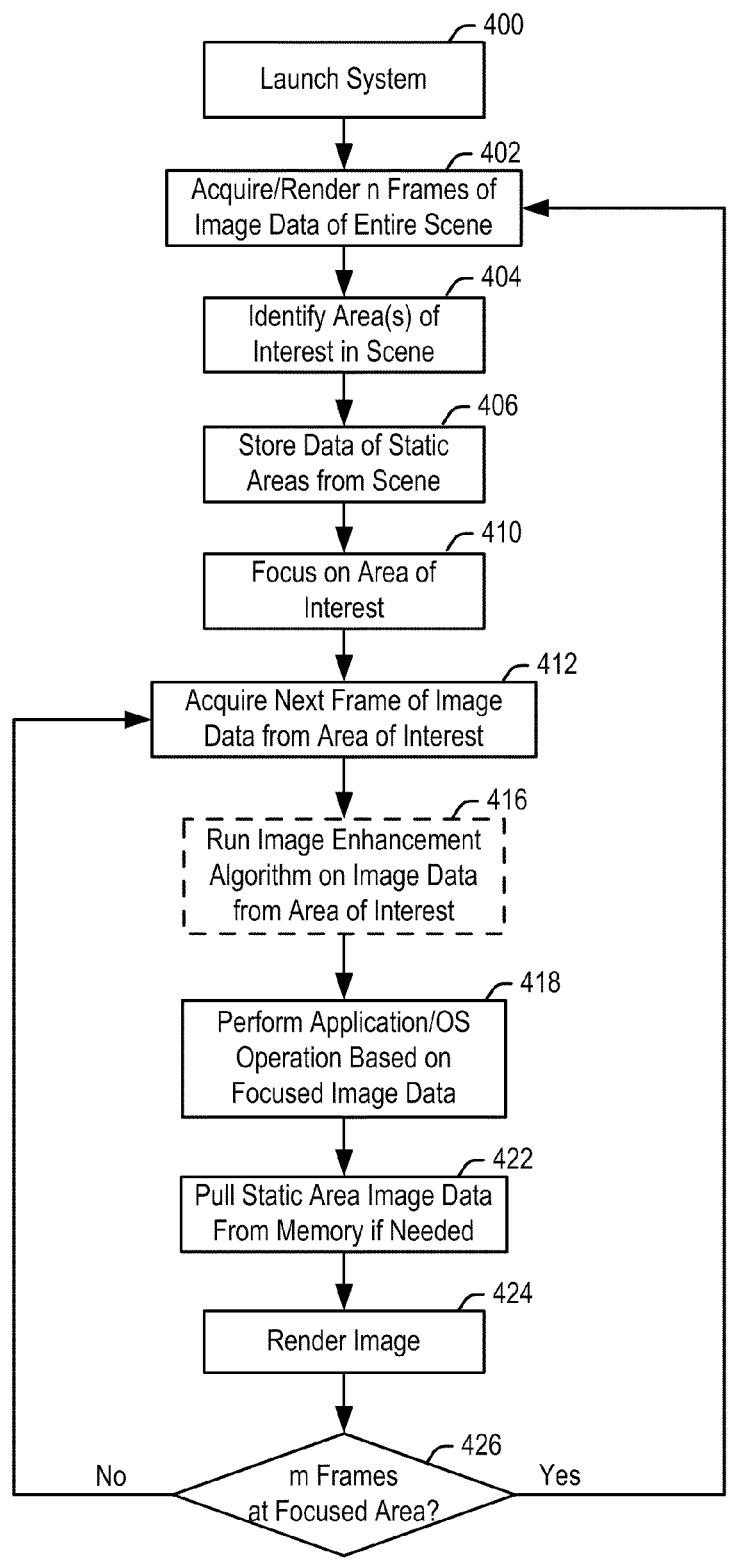
FIG. 11 is a flowchart of the operation of one embodiment of the present technology for focusing an image on an area of interest within a scene.
Figure 12:
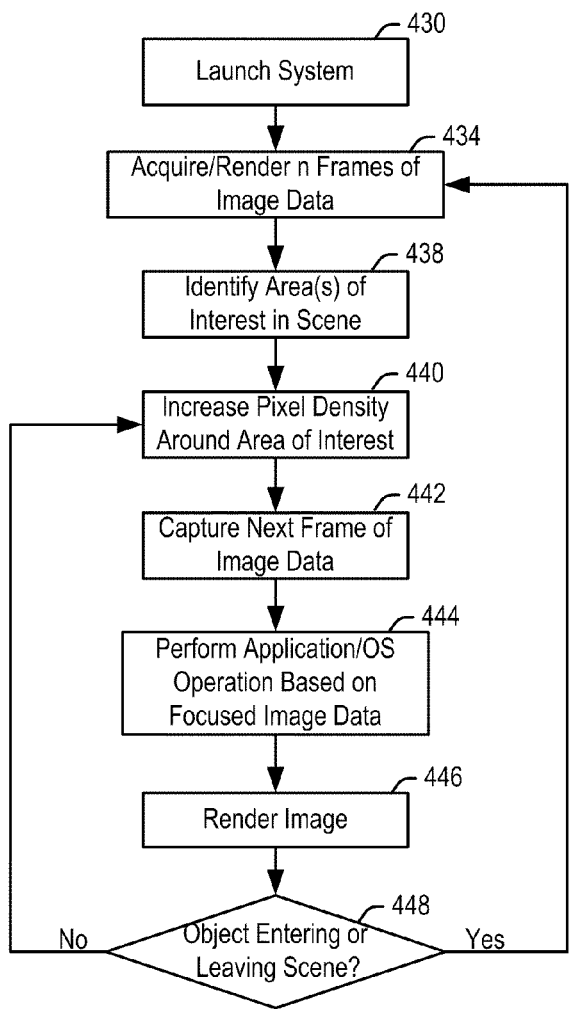
FIG. 12 is a flowchart of the operation of a further embodiment of the present technology for focusing an image on an area of interest within a scene by increasing pixel density in that area.
Figure 13:
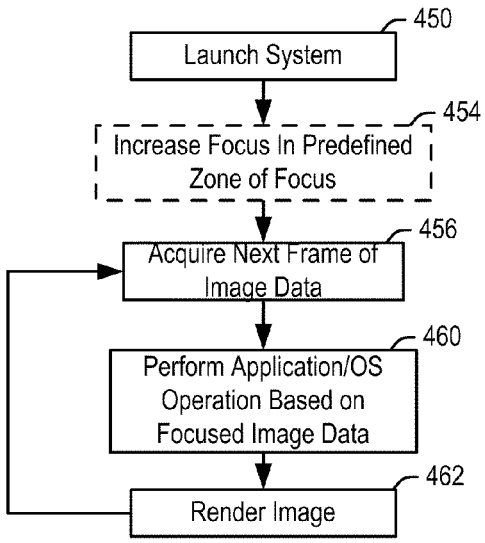
FIG. 13 is a flowchart of the operation of another embodiment of the present technology for passively increasing focus in a zone of focus on an area of interest in a scene.

In the embodiment of FIGS. 10 and 13, the one or more predefined zone(s) of focus may be positioned at arbitrarily selected locations for the scene. FIG. 10 shows a zone of focus 356 along a mid-level height along the y-axis and along the entire x-axis. Although not indicated in FIG. 10, the zone of focus may extend along the entire z-axis. This zone of focus 356 is by way of example and may be set up to define any 3-D region in the scene as the zone of focus. In embodiments, this zone may be fixed and permanent for a given capture device 20, regardless of the application running on the computing environment 12.

In further embodiments, instead of being permanent, the application running on the computing environment 12 may set the zone of focus 356 based on the application. In such embodiments, the zone of focus would be stationary for the duration the application is running For example, if the application was a soccer game, the zone of focus may be along a bottom portion of the y-axis to catch detailed movement of a player's feet, as well as at a top portion of the y-axis to catch detailed movement of the player's head. For a lip-reading application, the zone of focus may be along a top portion of the y-axis and along a portion of the x-axis to capture greater detail of the user's face. The zone of focus 356 may also be set in a middle portion along the y-axis as shown in FIG. 10 to capture more detail of a user's hand when interacting with a user menu or other control function for an application or operating system. Those of skill in the art will appreciate a wide variety of other locations for the zone of focus 356 depending on the application or operation being performed.

In the above embodiments, the zone of focus 356 may be located in a single position for the duration an application is running. In further embodiments, it is conceivable that the zone of focus 356 is moved under the control of the application. For example, a first time period of an application may need detailed image data relating to a user's feet, and a second time period of the application may need detailed image data relating to the user's hands. In such an example, the application may move the zone of focus when the application transitions from the first to the second time periods.

In the passive focus embodiments of FIGS. 10 and 13, the focus in the zone of focus may be greater than for areas of the scene outside of the zone of focus. Thus, image data for users or objects within the zone of focus 356 will be greater than for image data outside of the zone of focus. The detail of the image data may be increased in the zone of focus by any of the methods described above with respect to the actively identified areas of interest. Such methods include but are not limited to optical and digital zooming, enhancing algorithms, increasing the pixel density in the zone of focus, and decreasing the pixel density in the areas outside of the zone of focus (for example by pixel binning) Two separate capture devices 20, capturing image data at different resolutions, may also be used to define the zone of focus within a scene.

Additionally, for embodiments where the zone of focus for a given capture device is permanent, the zone of focus may be created by shaping the lens or otherwise controlling the lens characteristics of the cameras in the capture device. For example, the lens may be formed to create a fish-eye effect, where objects in the center of the image are larger than objects toward the sides. Such an effect results in an image where the objects in the center of the image have more pixels and more detail than objects toward the sides. The camera lens may be tailored by other methods to move the zone of focus to any desired area within a scene.

FIG. 13 shows the operation of an embodiment of a passive zone of focus. In step 450, the system 10 may be launched. In step 454, the focus in the zone of focus may be increased relative to areas outside of the zone of focus by any of the methods described above. In embodiments where the increase in the zone of focus is automatically created as a result of lens characteristics, step 454 would be skipped (as increased focus would be inherent to that system and no separate step would need to be actively performed). Step 454 is thus shown in dashed lines in FIG. 13.

Thereafter, operation of the passive focus embodiment goes forward as in normal image capture operations. Image data is captured in step 465. That image data may be used for gesture recognition, application control and/or operating system control in step 460. As described above, given the increased detail of the image data from the zone of focus, data from within this zone may be used for discerning between subtle movements and gestures. The image data including the higher density image data for the area of interest may also be used to render an image in step 462, and then steps 456 through 462 are repeated for subsequent frames of data.

In the embodiments described so far, increased detail from a scene has been accomplished within a camera or by processing the image data from the camera. However, the illumination of a scene may also have a significant effect on how much detail can be derived from an illuminated area. Typically, NUI systems employ an illumination system attempting to evenly illuminate all areas of a scene. However, as explained above, it may be helpful to get more detail from some areas of a scene, and less important to get detail from others. As such, the IR light source 24 may be actively or passively controlled to better illuminate certain areas of interest within the scene. Active and passive illumination embodiments are explained with reference to FIGS. 14 and 15 below.

Figure 14:
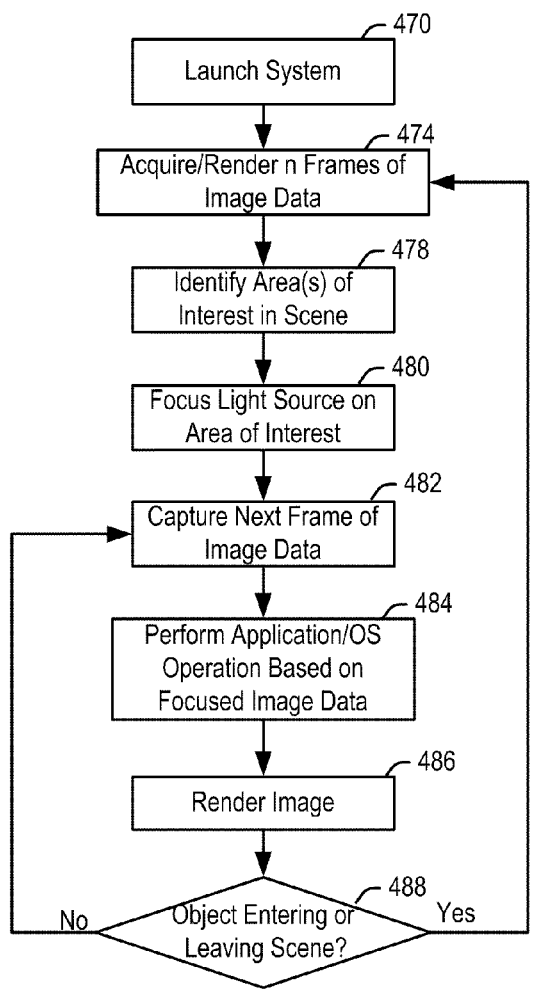
FIG. 14 is a flowchart of the operation of a further embodiment of the present technology for increasing the amount of light incident on objects within an area of interest in a scene.

Referring initially to FIG. 14, the steps 470 through 478 of launching the system 10, acquiring n frames of image data and identifying an area of interest in the scene are as described above. In step 480, the IR light source 24 may be focused on that area. This may be done in a number of ways. In one embodiment, the light source may be focused by mechanical means, such as for example narrowing the emitted light, and supporting the light source 24 on a support such as a 2-axis gimbal that allows controlled pivoting of the light source in the x-y plane of the scene. Other mechanical systems are known.

In a further embodiment, the light from the source 24 may be filtered to emphasize one or more wavelengths over others. These wavelengths are selected based on properties of the objects in the area of interest. In particular, the one or more wavelengths are selected based on which wavelengths will have the greatest reflectivity off of the objects in the area of interest.

In either embodiment, the better illumination of the area of interest by focusing of the light source will increase the information and detail in the pixels that receive the light reflected from the area of interest. Moreover, any decrease in the light reflected from the static areas of the scene will decrease the light noise in the pixels of the area of interest.

The focused light embodiment may operate with any of the light systems described above for IR light source 24, including for example pulsed light, phase measurement, time of flight and structured light. It may be desirable to adjust one of the pulse frequency, light pattern and phase of the light emitted from IR light source 24 for one or more of these light systems, depending on where in the scene the light is directed.

In step 482, the next frame of data is captured. That image data may be used for gesture recognition, application control and/or operating system control in step 484 as described above. The image data may also be used to render an image in step 486 as explained above. In step 488, the focus engine 192 checks for any objects entering or leaving the scene from the new frame of data. If no objects are detected entering or leaving the scene, the area(s) of interest stay the same. The system returns to step 482 and captures the next frame of data using the same focused light. On the other hand, if an object is detected entering or leaving the scene, the focus engine 192 returns to step 474 so that the area(s) of interest may again be identified.

Figure 15:
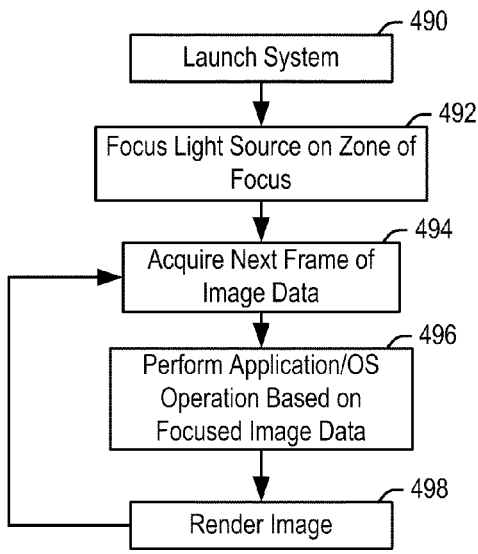
FIG. 15 is a flowchart of the operation of another embodiment of the present technology for passively increasing the amount of light incident on objects within an area of interest in a scene.

FIG. 15 shows an embodiment where the light from the light source may be directed to a passive zone of focus. In such an embodiment, the light source stays trained on a particular zone, regardless of movement into or out of a scene. The system 10 may be launched in step 490, and the light source focused on a particular, arbitrarily selected zone in step 492. With the light source focused on a particular zone, the next frame of data is acquired in step 494. The image data from the image may then be used to recognize a user gesture, control aspects of the application running on the computing environment and/or control aspects of the operating system on the computing environment 12 in step 496. The image may be rendered in step 498, and then steps 494 through 498 are repeated for subsequent frames of data.

The active and passive focusing of the light source as described above with respect to FIGS. 14 through 15 may be used instead of, or in conjunction with, the active and passive focusing on the image detail as described above with respect to FIGS. 11 through 13.

Figure 16:
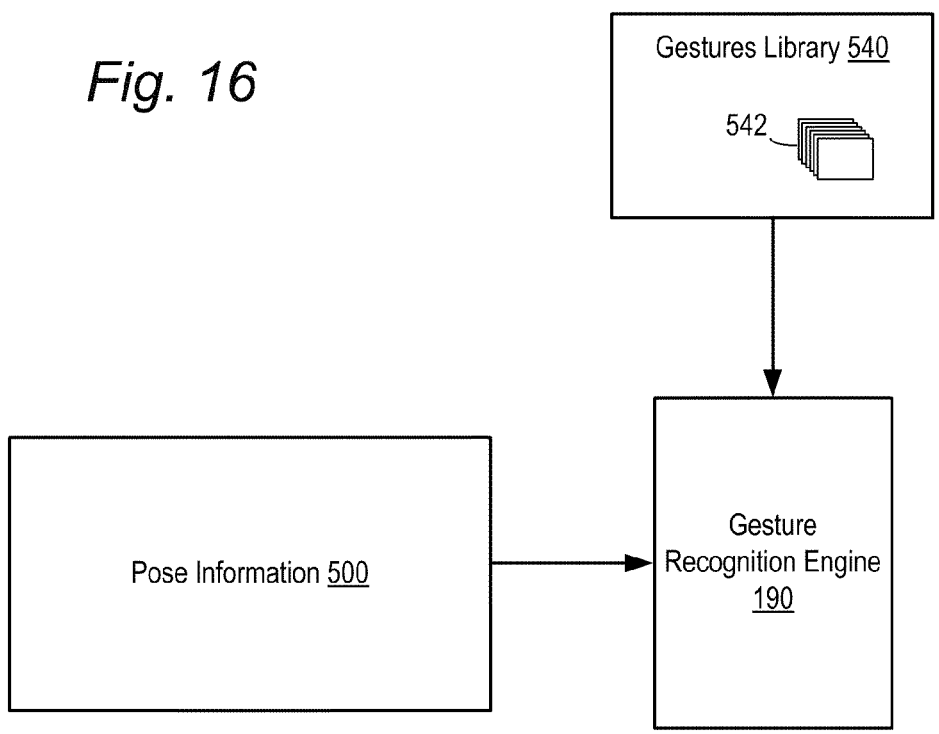
FIG. 16 is a block diagram showing a gesture recognition engine for recognizing gestures.
Figure 17:
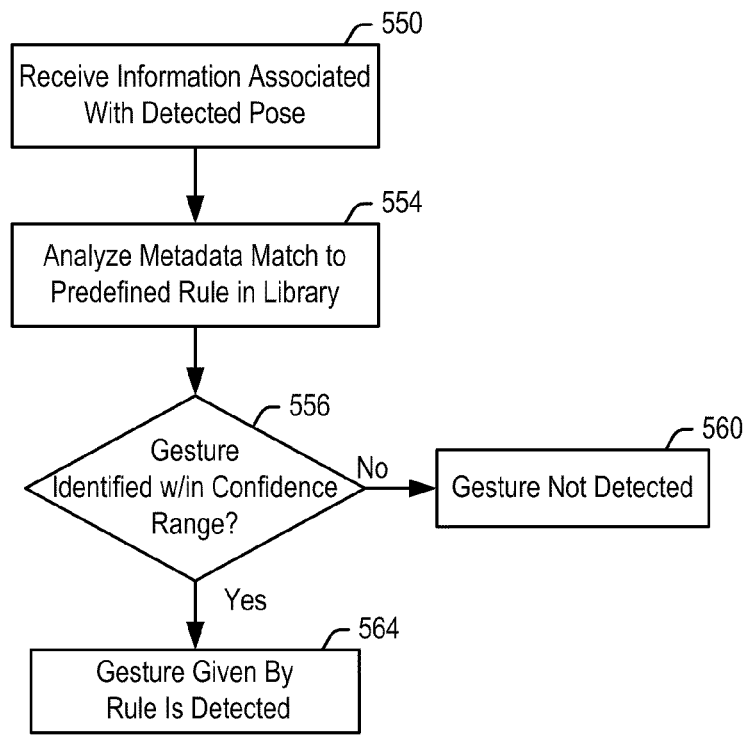
FIG. 17 is a flowchart of the operation of the gesture recognition engine of FIGS. 16.

As described above, providing greater detail within image data can facilitate better gesture detection, and the detection of finer, more subtle gestures. FIG. 15 shows a block diagram of a gesture recognition engine 190, and FIG. 16 shows a block diagram of the operation of the gesture recognition engine 190 of FIG. 15. The gesture recognition engine 190 receives pose information 500 in step 550. The pose information may include a variety of parameters relating to position and/or motion of the user's body parts and joints as detected in the image data.

The gesture recognition engine 190 analyzes the received pose information 500 in step 554 to see if the pose information matches any predefined rule 542 stored within a gestures library 540. A stored rule 542 describes when particular positions and/or kinetic motions indicated by the pose information 500 are to be interpreted as a predefined gesture. In embodiments, each gesture may have a different, unique rule or set of rules 542. Each rule may have a number of parameters (joint position vectors, maximum/minimum position, change in position, etc.) for one or more of the body parts shown in FIG. 4. A stored rule may define, for each parameter and for each body part 302 through 330 shown in FIG. 4, a single value, a range of values, a maximum value, a minimum value or an indication that a parameter for that body part is not relevant to the determination of the gesture covered by the rule. Rules may be created by a game author, by a host of the gaming platform or by users themselves.

The gesture recognition engine 190 may output both an identified gesture and a confidence level which corresponds to the likelihood that the user's position/movement corresponds to that gesture. In particular, in addition to defining the parameters required for a gesture, a rule may further include a threshold confidence level required before pose information 500 is to be interpreted as a gesture. Some gestures may have more impact as system commands or gaming instructions, and as such, require a higher confidence level before a pose is interpreted as that gesture. The comparison of the pose information against the stored parameters for a rule results in a cumulative confidence level as to whether the pose information indicates a gesture.

Once a confidence level has been determined as to whether a given pose or motion satisfies a given gesture rule, the gesture recognition engine 190 then determines in step 556 whether the confidence level is above a predetermined threshold for the rule under consideration. The threshold confidence level may be stored in association with the rule under consideration. If the confidence level is below the threshold, no gesture is detected (step 560) and no action is taken. On the other hand, if the confidence level is above the threshold, the user's motion is determined to satisfy the gesture rule under consideration, and the gesture recognition engine 190 returns the identified gesture in step 564.

Given the greater image detail provided by the system of the present technology, gesture library 540 may include more subtle and finer gesture definitions than in conventional systems, and the pose information 500 received may include more detailed information so that the system may determine if these more subtle and finer gestures have been performed.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. In a system comprising a computing environment coupled to a capture device for capturing motion, a method of increasing image detail in one or more areas of interest in a scene captured by the capture device, comprising:

a) receiving information from the scene;
   b) identifying the one or more areas of interest within the scene;

c) obtaining greater image detail on the one or more areas of interest within the scene relative to areas in the scene outside of the one or more areas of interest, said step c) comprising obtaining greater image detail by increasing resolution of the one or more areas of interest within the scene, and said step c) comprising obtaining greater image detail by increasing the illumination from a light source of the one or more areas of interest within the scene; and d) at least periodically monitoring information in the scene outside the one or more areas of interest to determine whether to re-define the one or more areas of interest.

2. The method of claim 1, said step b) of identifying the one or more areas of interest within the scene comprising the step of identifying areas of movement within the scene.

3. The method of claim 2, said step b) of identifying areas of movement within the scene comprising running an algorithm for identifying body parts and recognizing a skeletal pattern and comparing a frame of image data against an earlier frame of image data.

4. The method of claim 1, said step c) of obtaining greater image detail on the one or more areas of interest within the scene comprising the step of performing one of a mechanical zoom or digital zoom to focus on at least one area of interest in the one or more areas of interest.

5. The method of claim 1, said step c) of obtaining greater image detail on the one or more areas of interest within the scene comprising the step of enhancing the image data by performing an image enhancing algorithm on the image data.

6. The method of claim 1, said step c) of obtaining greater image detail on the one or more areas of interest within the scene comprising the step of increasing the pixel density around the one or more areas of interest.

7. The method of claim 1, said step c) of obtaining greater image detail on the one or more areas of interest within the scene comprising the step of altering an applied light source to focus the light source on at least one area of interest of the one or more areas of interest.

8. The method of claim 1, said step c) of obtaining greater image detail on the one or more areas of interest within the scene comprising the step of combining together pixels of the image data for areas outside of the one or more areas of interest.

9. The method of claim 1, said step b) of identifying the one or more areas of interest within the scene comprising the step of identifying a three dimensional area of interest within the scene.

10. The method of claim 1, further comprising the step of rendering an image on a display associated with the computing environment using image data from the one or more areas of interest from a current frame and image data from the areas outside of the one or more areas of interest from a frame prior to the current frame.

11. In a gaming system comprising a computing environment coupled to a capture device for capturing motion, a method of increasing image detail in one or more areas of interest in a scene captured by the capture device, comprising:

a) receiving information from the scene;

b) employing a skeletal recognition algorithm to identify one or more users within the scene;

c) obtaining greater image detail on at least a body part of the one or more users within the scene relative to areas in the scene other than the one or more users, said step c) comprising obtaining greater image detail by increasing resolution of an image captured of the at least one body part, and said step c) comprising obtaining greater image detail by increasing the illumination from a light source of the at least one body part;

d) using the greater image detail obtained on at least the body part of the one or more users within the scene in said step c) to identify a gesture performed by the one or more users; and e) at least periodically monitoring information in the scene outside the one or more users to determine whether to add or subtract a user to the group of one or more users on which greater image detail is obtained in said step c).

12. The method of claim 11, said step c) of obtaining greater image detail on at least a body part of the one or more users comprising the step of obtaining greater image detail on two different objects.

13. The method of claim 12, said step c) of obtaining greater image detail on two different objects comprising the step of obtaining greater image detail on an entire user and obtaining greater detail on a body part of a user.

14. The method of claim 11, said step d) of using the greater image detail to identify a gesture comprising the step of using the greater image detail to identify a gesture performed by one of a foot, hand, face or mouth of the user.

* * * * *